United States Patent
Tamura

(10) Patent No.: US 9,001,266 B2
(45) Date of Patent: Apr. 7, 2015

(54) IMAGING DEVICE AND LIGHT EMISSION AMOUNT CONTROL METHOD OF THE SAME

(71) Applicant: FUJIFILM Corporation, Tokyo (JP)

(72) Inventor: Kazunori Tamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 114 days.

(21) Appl. No.: 13/935,126

(22) Filed: Jul. 3, 2013

(65) Prior Publication Data

US 2013/0293745 A1 Nov. 7, 2013

Related U.S. Application Data

(63) Continuation of application No. PCT/JP2011/075492, filed on Nov. 4, 2011.

(30) Foreign Application Priority Data

Jan. 6, 2011 (JP) ................................. 2011-001551

(51) Int. Cl.
*H04N 5/222* (2006.01)
*H04N 5/238* (2006.01)
*H04N 5/235* (2006.01)
*G03B 7/16* (2014.01)
(Continued)

(52) U.S. Cl.
CPC ........... *H04N 5/2354* (2013.01); *H04N 5/2351* (2013.01); *H04N 2201/0084* (2013.01); *G03B 7/16* (2013.01); *G03B 15/05* (2013.01); *H04N 5/23248* (2013.01)

(58) Field of Classification Search
None
See application file for complete search history.

(56) References Cited

U.S. PATENT DOCUMENTS

| 7,457,477 B2* | 11/2008 | Petschnigg et al. ............ 348/370 |
| 2002/0064384 A1* | 5/2002 | Kawasaki et al. .............. 396/157 |
| 2007/0047945 A1* | 3/2007 | Nose et al. ..................... 396/157 |

(Continued)

FOREIGN PATENT DOCUMENTS

| JP | 2000-10148 A | 1/2000 |
| JP | 2003-66505 A | 3/2003 |

(Continued)

OTHER PUBLICATIONS

Japanese Office Action issued in corresponding Japanese Patent Application No. 2012-551793 on Nov. 4, 2014, along with a partial English translation thereof.

*Primary Examiner* — Jason Flohre

(74) *Attorney, Agent, or Firm* — Birch, Stewart, Kolasch & Birch, LLP

(57) ABSTRACT

An imaging device performs control for changing evaluation values calculated for specific areas which are at least a portion of segment areas around a segment area where a brightness difference calculated by subtracting non-light emission image data from pre-light emission image data is negative or a segment area where a brightness difference calculated by subtracting the pre-light emission image data from the non-light emission image data is positive so that the evaluation values are reduced when the brightness difference is calculated by subtracting the non-light emission image data from the pre-light emission image data and an absolute value of the negative evaluation values are reduced when the brightness difference is calculated by subtracting the pre-light emission image data from the non-light emission image data, in a case where the brightness differences of all segment areas include negative and positive values together.

12 Claims, 10 Drawing Sheets

NON-LIGHT EMISSION TAKEN IMAGE

PRE-LIGHT EMISSION TAKEN IMAGE

(51) Int. Cl.
*G03B 15/05* (2006.01)
*H04N 5/232* (2006.01)

(56) References Cited

U.S. PATENT DOCUMENTS

| | | | |
|---|---|---|---|
| 2007/0052840 A1* | 3/2007 | Okuno | 348/364 |
| 2007/0091202 A1* | 4/2007 | Kawamura | 348/362 |
| 2008/0199172 A1* | 8/2008 | Hamada | 396/157 |
| 2009/0225182 A1* | 9/2009 | Tamura | 348/222.1 |
| 2010/0020200 A1* | 1/2010 | Fujiwara | 348/234 |
| 2011/0044680 A1* | 2/2011 | Fukui | 396/164 |

FOREIGN PATENT DOCUMENTS

| | | |
|---|---|---|
| JP | 2004-264783 A | 9/2004 |
| JP | 2010-26284 A | 2/2010 |
| JP | 2010-114805 A | 5/2010 |
| JP | 2011-33979 | 2/2011 |

* cited by examiner

NON-LIGHT EMISSION TAKEN IMAGE

PRE-LIGHT EMISSION TAKEN IMAGE

FIG. 4

| 1 | 1 | 1 | 1 | 1 | 1 | 1 | 1 | 1 | 1 | 1 | 1 |
|---|---|---|---|---|---|---|---|---|---|---|---|
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |

FIG. 5

| 5 | 6 | 7 | 7 | 7 | 7 | 7 | 7 | 7 | 7 | 6 | 5 |
|---|---|---|---|---|---|---|---|---|---|---|---|
| 5 | 6 | 7 | 8 | 8 | 8 | 8 | 8 | 8 | 7 | 6 | 5 |
| 5 | 6 | 7 | 8 | 9 | 9 | 9 | 9 | 8 | 7 | 6 | 5 |
| 5 | 6 | 7 | 8 | 9 | 10 | 10 | 9 | 8 | 7 | 6 | 5 |
| 5 | 6 | 7 | 8 | 9 | 10 | 10 | 9 | 8 | 7 | 6 | 5 |
| 5 | 6 | 7 | 8 | 9 | 9 | 9 | 9 | 8 | 7 | 6 | 5 |
| 5 | 6 | 7 | 8 | 8 | 8 | 8 | 8 | 8 | 7 | 6 | 5 |
| 5 | 6 | 7 | 7 | 7 | 7 | 7 | 7 | 7 | 7 | 6 | 5 |

FIG. 8

| 1 | 1 | 1 | 1 | 1 |
|---|---|---|---|---|
| 1 | 0.1 | 0.1 | 0.1 | 1 |
| 1 | 0.1 | — | 0.1 | 1 |
| 1 | 0.1 | — | 0.1 | 1 |
| 1 | 0.1 | 0.1 | 0.1 | 1 |
| 1 | 1 | 1 | 1 | 1 |

B1
B2

WEIGHT VALUE CHANGE EXAMPLE
(WEIGHT VALUE CHANGE CONSIDERING
SHAKE DIRECTION OF CAMERA)

WEIGHT VALUE CHANGE EXAMPLE
(WEIGHT VALUE CHANGE CONSIDERING
MOVEMENT DIRECTION OF SUBJECT)

IMAGING DEVICE AND LIGHT EMISSION AMOUNT CONTROL METHOD OF THE SAME

CROSS-REFERENCE TO RELATED APPLICATIONS

This is a continuation of International Application No. PCT/JP2011/075492 filed on Nov. 4, 2011, and claims priority from Japanese Patent Application No. 2011-001551 filed on Jan. 6, 2011, the entire disclosures of which are incorporated herein by reference.

TECHNICAL FIELD

The present invention relates to an imaging device, and a light emission amount control method of the imaging device.

BACKGROUND ART

Digital cameras for emitting auxiliary light (flash light) to subjects and taking images are in widespread use.

In these digital cameras, as a scheme of controlling an amount of auxiliary light emission when image taking is performed, a preliminary light emission control scheme is known.

The preliminary light emission control scheme is a scheme of sequentially performing non-light emission image taking in which auxiliary light emission is not performed, and pre-light emission image taking in which preliminary light emission (pre-light emission) is performed such that a predetermined amount of auxiliary light is emitted, prior to primary image taking, and calculating an amount of auxiliary light emission for primary image taking, on the basis of a brightness difference between an image taken by the non-light emission image taking and an image taken by the pre-light emission image taking.

In the preliminary light emission control scheme, specifically, an amount of light emission for primary image taking is obtained as follows, for example.

First, the image taken by the non-light emission image taking and the image taken by the pre-light emission image taking are divided into a plurality of areas common to them, and for each area, a brightness difference between the image taken by the non-light emission image taking and the image taken by the pre-light emission image taking is calculated. Next, the brightness difference calculated for each area is multiplied by a weight coefficient set for each area, whereby an evaluation value is calculated for each area. Next, an area with a large evaluation value is selected as a main subject area, and an amount of light emission for primary image taking is determined such that the main subject area has appropriate brightness.

In this preliminary light emission control scheme, in a scene where a light source exists in the background of a main subject, in a case where the light source has moved during pre-light emission image taking, a case where the position of the light source in the taken image has changed by shakes of a digital camera, and the like, it is impossible to perform satisfactory image taking.

In the case where the light source has moved during the pre-light emission image taking, and the case where the position of the light source in the taken image has changed by shakes of a digital camera, a brightness difference of an area including the light source in an image taken by the pre-light emission image taking becomes large. As a result, the evaluation value of that area becomes large, and thus the area including the light source is erroneously selected as a main subject area. If this erroneous selection exists, an amount of light emission for primary image taking is dragged by the light source of the background of the main subject such that the amount of light emission is set to be small, and thus it is impossible to perform satisfactory image taking.

Patent Document 1 discloses a camera using the preliminary light emission control scheme and a so-called flash-matic scheme of determining an amount of light emission on the basis of a distance to a subject, a diaphragm of an imaging optical system, ISO sensitivity, and so on. In this camera, a subject state is determined by comparing an amount of light emission determined by the preliminary light emission control scheme with an amount of light emission determined by the flash-matic scheme, and according to the determined subject state, which one of the amounts of light emission determined by those schemes will be used as an amount of light emission for image taking is determined.

According to the camera disclosed in Patent Document 1, since an amount of light emission determined by any one of the two dimming schemes is set as an amount of auxiliary light emission for primary image taking, it is possible to accurately determine the amount of auxiliary light emission for primary image taking.

Patent Document 1: Japanese Patent Application Publication No.: 2004-264783

However, in the camera disclosed in Patent Document 1, in the preliminary light emission control scheme, there is a possibility that a reduction in the amount of light emission according to movement of a light source as described above will occur. In a case where a reduction in the amount of light emission occurs, it is impossible to accurately determine a subject state, and as a result, it is impossible to accurately determine control on the amount of light emission. Also, since it is necessary to perform both of calculation of the amount of light emission according to the preliminary light emission control scheme and calculation of the amount of light emission according to the flash-matic scheme, it takes a long time to determine the amount of light emission.

The present invention was made in view of the above-mentioned circumferences, and an object of the present invention is to provide an imaging device capable of quickly determining an amount of auxiliary light emission with high accuracy, and a light emission amount control method of the imaging device.

SUMMARY

An imaging device according to the present invention is an imaging device having a light emitting unit for emitting auxiliary light during image taking, comprising: a taken image data acquiring unit that acquires non-light emission taken image data which is obtained by non-light emission image taking in which image taking is performed in a state where auxiliary light is not emitted from the light emitting unit, and pre-light emission taken image data which is obtained by pre-light emission image taking in which image taking is performed in a state where auxiliary light is emitted from the light emitting unit; a brightness difference calculating unit that calculates a brightness difference obtained by subtracting the pre-light emission taken image data from the non-light emission taken image data or a brightness difference obtained by subtracting the non-light emission taken image data from the pre-light emission taken image data, for each of segment areas common to the non-light emission taken image data and the pre-light emission taken image data; an evaluation value calculating unit that calculates an evaluation value of each of the segment areas on the basis of the brightness difference of each of the segment areas; a light emission amount determining unit that determines a light emission amount of auxiliary light to be emitted from the light emitting unit during primary image taking, on the basis of the evaluation value of each of the segment areas; and an evaluation value change control unit that performs control for changing the evaluation values which are calculated with respect to specific areas which are at least a portion of segment areas around a segment area in which the brightness difference calculated by subtracting the non-light emission taken image data from the pre-light emission taken image data is negative or a segment area in which the brightness difference calculated by subtracting the pre-light emission taken image data from the non-light emission taken image data is positive so that the evaluation values are reduced when the brightness difference is calculated by subtracting the non-light emission taken image data from the pre-light emission taken image data and an absolute value of the negative evaluation values are reduced (i.e. the evaluation values are increased) when the brightness difference is calculated by subtracting the pre-light emission taken image data from the non-light emission taken image data, in a case where the brightness differences of all of the segment areas calculated by the brightness difference calculating unit include negative brightness differences and positive brightness differences together.

A light emission amount control method of an imaging device according to the present invention is a light emission amount control method of an imaging device having a light emitting unit for emitting auxiliary light during image taking, comprising: a taken image data acquiring step that acquires non-light emission taken image data which is obtained by non-light emission image taking in which image taking is performed in a state where auxiliary light is not emitted from the light emitting unit, and pre-light emission taken image data which is obtained by pre-light emission image taking in which image taking is performed in a state where auxiliary light is emitted from the light emitting unit; a brightness difference calculating step that calculates a brightness difference obtained by subtracting the pre-light emission taken image data from the non-light emission taken image data or a brightness difference obtained by subtracting the non-light emission taken image data from the pre-light emission taken image data, for each of segment areas common to the non-light emission taken image data and the pre-light emission taken image data; an evaluation value calculating step that calculates an evaluation value of each of the segment areas on the basis of the brightness difference of each of the segment areas; a light emission amount determining step that determines a light emission amount of auxiliary light to be emitted from the light emitting unit during primary image taking, on the basis of the evaluation value of each of the segment areas; and an evaluation value change control step that performs control for changing the evaluation values which are calculated with respect to specific areas which are at least a portion of segment areas around a segment area in which the brightness difference calculated by subtracting the non-light emission taken image data from the pre-light emission taken image data is negative or a segment area in which the brightness difference calculated by subtracting the pre-light emission taken image data from the non-light emission taken image data is positive so that the evaluation values are reduced when the brightness difference is calculated by subtracting the non-light emission taken image data from the pre-light emission taken image data and an absolute value of the negative evaluation values are reduced (i.e. the evaluation values are increased) when the brightness difference is calculated by subtracting the pre-light emission taken image data from the non-light emission taken image data, in a case where the brightness differences of all of the segment areas calculated by the brightness difference calculating step include negative brightness differences and positive brightness differences together.

According to the present invention, it is possible to provide an imaging device capable of quickly determining an amount of auxiliary light emission with high accuracy, and a light emission amount control method of the imaging device.

BRIEF DESCRIPTION OF DRAWINGS

FIG. 4 is a view illustrating an example of weight data.

FIG. 5 is a view illustrating an example of the weight data.

FIG. 8 is a view illustrating an example of change of weight values of segment areas around segment areas where brightness differences are negative.

DETAILED DESCRIPTION

Hereinafter, an embodiment of the present invention will be described with reference to the drawings.

Figure 1:
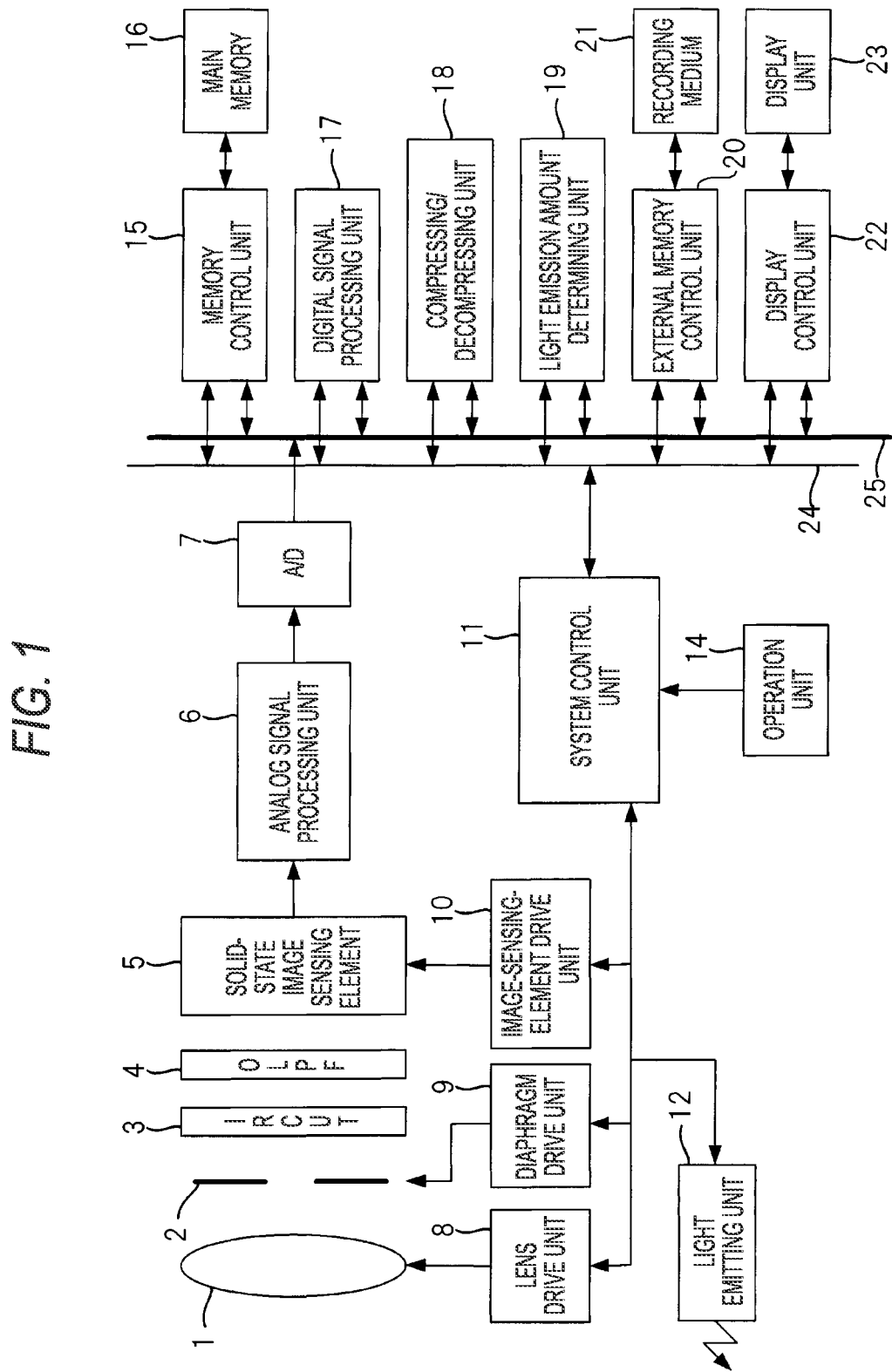
FIG. 1 is a view illustrating the schematic configuration of a digital camera for explaining an embodiment of the present invention.

FIG. 1 is a view illustrating the schematic configuration of a digital camera for explaining an embodiment of the present invention. As imaging devices, there are imaging devices such as digital cameras and digital video cameras, imaging modules which are mounted on camera-equipped portable phones and the like, etc. Here, a digital camera will be described as an example.

An imaging system of the digital camera shown in the drawing includes an optical system 1 including a focus lens, a solid-state image sensing element 5 such as a CCD type image sensor or a MOS type image sensor, a diaphragm 2 provided between the optical system 1 and the solid-state image sensing element 5, an infrared cut filter 3, and an optical lowpass filter 4.

A system control unit 11 for generally controlling the entire electric control system of the digital camera controls a light emitting unit 12 for emitting auxiliary light during image taking, and controls a lens drive unit 8 such that the lens drive unit adjusts the position of the focus lens to a focus position or performs zooming of a zoom lens, and controls the opening amount of the diaphragm 2 through a diaphragm drive unit 9, thereby adjusting an exposure amount.

Also, the system control unit 11 drives the solid-state image sensing element 5 through an image-sensing-element drive unit 10 such that the solid-state image sensing element outputs a subject image taken through the optical system 1, as an taken image signal. The system control unit 11 receives an instruction signal from a user through an operation unit 14. The operation unit 14 includes a shutter button for issuing an image taking instruction to the digital camera, and so on.

The light emitting unit 12 is composed of a light emitting device for emitting flash light as auxiliary light to subjects.

The electric control system of the digital camera further includes an analog signal processing unit 6 that is connected to the output of the solid-state image sensing element 5 and performs analog signal processing such as a correlation double sampling process, and an A/D conversion circuit 7 for converting the taken image signal output from the analog signal processing unit 6 into a digital signal, and the analog signal processing unit and the A/D conversion circuit are controlled by the system control unit 11.

Furthermore, the electric control system of the digital camera includes a main memory 16, a memory control unit 15 connected to the main memory 16, a digital signal processing unit 17 for performing interpolation calculation, gamma correction calculation, an RGB-to-YC conversion process, and the like, thereby generating taken image data, a compressing/decompressing unit 18 that compresses the taken image data generated by the digital signal processing unit 17 into a JPEG format, or decompresses compressed image data, an light emission amount determining unit 19 that determines an amount of auxiliary light emission to be emitted from the light emitting unit 12, an external memory control unit 20 which a detachable recording medium 21 is connected to, and a display control unit 22 which a liquid crystal display unit 23 mounted on the rear surface or the like of the camera is connected to.

The memory control unit 15, the digital signal processing unit 17, the compressing/decompressing unit 18, the light emission amount determining unit 19, the external memory control unit 20, and the display control unit 22 are connected to one another by a control bus 24 and a data bus 25, and are controlled by commands from the system control unit 11.

The light emission amount determining unit 19 acquires non-light emission taken image data which is taken by non-light emission image taking in which image taking is performed by the solid-state image sensing element 5 in a state where auxiliary light is not emitted from the light emitting unit 12, and pre-light emission taken image data which is taken by pre-light emission image taking in which image taking is performed by the solid-state image sensing element 5 in a state where auxiliary light is emitted (freely emitted) from the light emitting unit 12. Next, the light emission amount determining unit 19 obtains an amount of reflected light from a main subject according to pre-light emission, from a brightness difference between the non-light emission taken image data and the pre-light emission taken image data, and determines an amount of light emission for primary image taking on the basis of the amount of reflected light.

Figure 2:
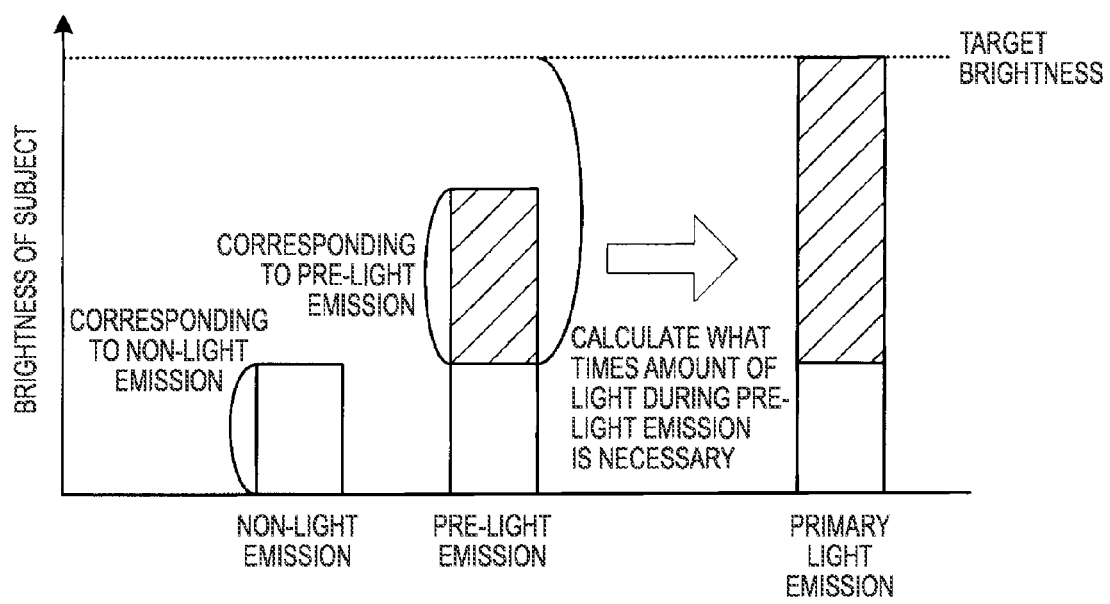
FIG. 2 is a view for explaining light emission amount determination control which a light emission amount determining unit 19 of the digital camera shown in FIG. 1 performs.

FIG. 2 is a view for explaining light emission amount determination control which a light emission amount determining unit 19 of the digital camera shown in FIG. 1 performs. As shown in FIG. 2, the light emission amount determining unit 19 obtains a difference between the brightness of a subject during the non-light emission image taking and the brightness of the subject during the pre-light emission image taking, and calculates what times an amount of light during the pre-light emission is necessary for the primary image taking, thereby determining an amount of light emission for the primary image taking.

Hereinafter, the process contents of the light emission amount determining unit 19 will be described in detail.

Figure 3A:
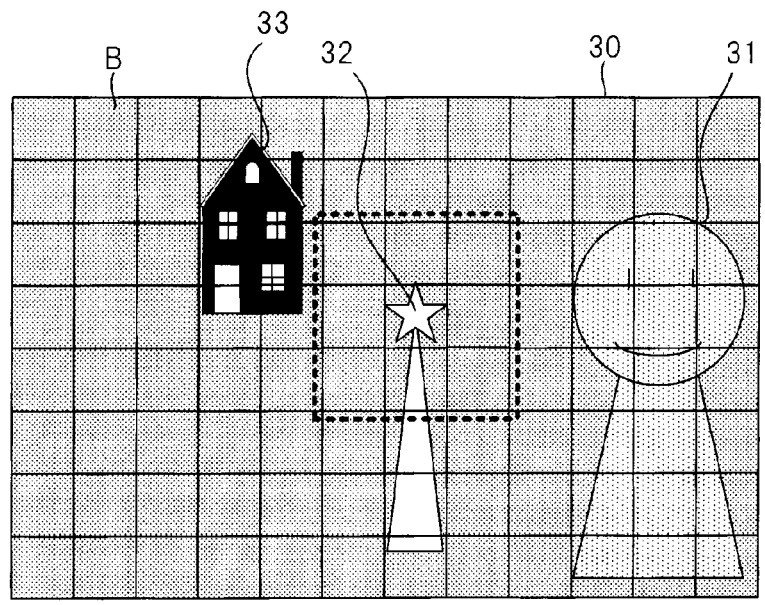
FIG. 3 is a view illustrating examples of non-light emission taken image data (FIG. 3A) which is taken by non-light emission image taking, and non-light emission taken image data (FIG. 3B) which is taken by pre-light emission image taking.
Figure 3B:
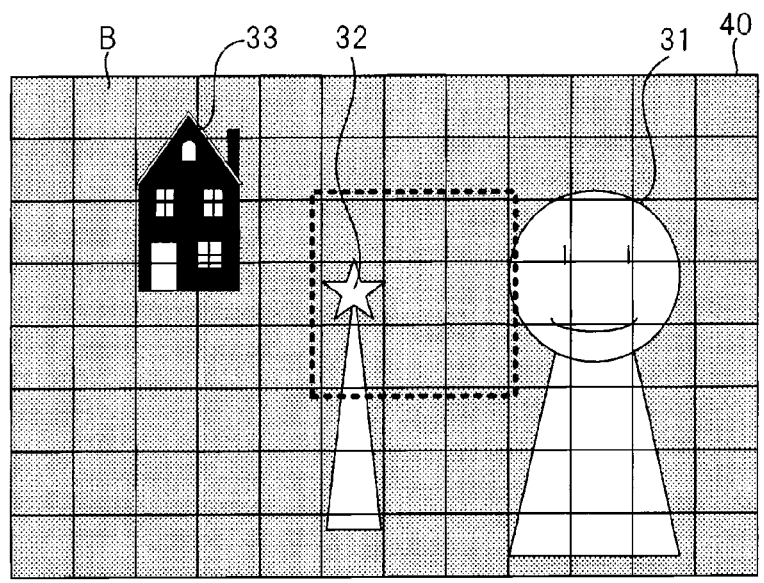

FIG. 3 is a view illustrating examples of the non-light emission taken image data (FIG. 3A) which is taken by the non-light emission image taking, and the pre-light emission taken image data (FIG. 3B) which is taken by pre-light emission image taking. Here, non-light emission taken image data and pre-light emission taken image data in a case where the system control unit 11 has performed control such that the pre-light emission image taking is performed subsequently after the non-light emission image taking, and the digital camera has shaken during the pre-light emission image taking are shown in the drawing.

Each of the non-light emission taken image data 30 and the pre-light emission taken image data 40 shown in FIG. 3 includes a human figure 31 which is a main subject, a Christmas tree 32 decorated with bulbs, and a house 33.

First, the light emission amount determining unit 19 divides the non-light emission taken image data 30 and the pre-light emission taken image data 40 into a plurality of areas B (96 areas in the example of FIG. 3) common to them.

Next, the light emission amount determining unit 19 calculates the average brightness value (average brightness) of image data of each area B for each of the non-light emission taken image data 30 and the pre-light emission taken image data 40.

Next, the light emission amount determining unit 19 calculates a brightness difference which is an average brightness value difference between the non-light emission taken image data 30 and the pre-light emission taken image data 40, for each area B.

Next, the light emission amount determining unit 19 reads corresponding weight data from the main memory 16 in which weight data including weight values set for the 96 areas B has been stored. Then, the light emission amount determining unit 19 multiplies the above-mentioned brightness difference calculated for each area B, by a weight value set for the corresponding area B, thereby calculating an evaluation value for each area B.

Also, as the weight data, data determined according to setting of the user, a scene for image taking, or the like, such as data in which the weight values are constant with respect to all of the 96 areas B as shown in FIG. 4, and data in which weight values of the center of the 96 areas B are large, and weight values become smaller toward the periphery may be used.

The light emission amount determining unit 19 determines areas having evaluation values equal to or larger than a threshold value among all areas B, as areas including the main subject. Next, on the basis of the evaluation values of the areas including the main subject, the light emission amount determining unit 19 determines the amount of light emission for the primary image taking.

Specifically, the light emission amount determining unit 19 calculates what times the amount of light during the pre-light emission is necessary to make the average brightness of the areas including the main subject of the pre-light emission taken image data 40 to target brightness (appropriate brightness), and converts the light emission amount calculation result into a light emission time, and terminates the light emission amount determining process. The light emission time determined here is notified to the system control unit 11, and the system control unit 11 makes auxiliary light be emitted from the light emitting unit 12 for the light emission time when the primary image taking is performed.

According to this flow, the light emission amount determining unit 19 determines the amount of auxiliary light emission (light emission time) for the primary image taking. However, in a case where the position of a bright light source such as the Christmas tree 32 has changed between the non-light emission image taking and the pre-light emission image taking as illustrated in FIG. 3, it is difficult to accurately determine the amount of light emission only by the above-mentioned process. The reason will be described below.

9 areas B which are surrounded by broken lines in FIG. 3 and are common to the non-light emission taken image data 30 should be noticed. In the non-light emission taken image data 30, in the center area B of the 9 areas B, and an area B below the center area, the Christmas tree 32 is included. However, in the pre-light emission taken image data 40, in a bottom left area B of the 9 areas B, and an area on the bottom left area, the Christmas tree 32 is included.

If the position of the Christmas tree 32 changes as described above, the brightness differences which are calculated for each of the 9 areas B become positive in the bottom left area B and the area B on the bottom left area, and become negative in the center area B and the area B below the center area such that areas B with positive and negative brightness differences exist together. Meanwhile, in a case where the position of the Christmas tree 32 does not change (the subject does not move and the digital camera does not shake), the brightness differences become positive in all of the 9 areas B only by the reflected light of the pre-light emission, such that any area B with a negative brightness difference does not exist.

The evaluation value relative to each area B is obtained by multiplying the above-mentioned brightness difference calculated for each area B by a weight value set for the corresponding area B. Therefore, if the value of the brightness difference calculated with respect to an area B increases, the evaluation value of the corresponding area B also naturally increases. In the situation where the position of the Christmas tree 32 does not change, a possibility that an area in which the value of the brightness difference is large will be an area B including the main subject is high. Therefore, if the amount of light emission for the primary image taking is determined on the basis of the evaluation values obtained with respect to the individual areas B, it is possible to accurately determine the amount of light emission for the primary image taking.

However, in the case where the position of the Christmas tree 32 changes as shown in FIG. 3, a bright light source appears in an area in which there was originally nothing. Therefore, in the pre-light emission taken image data 40, the values of the brightness differences of not only areas where there was actually reflected light of the pre-light emission but also the areas B including Christmas tree 32 increase. In other words, although there was actually little reflected light of the pre-light emission from the areas including the Christmas tree, it is misrecognized as there was reflected light of the pre-light emission. If the evaluation values are calculated in that situation, in the pre-light emission taken image data 40, the evaluation values of the areas B including the Christmas tree 32 increase although there was actually little reflected light of the pre-light emission. In other words, in areas in which the evaluation values should be calculated only on the basis of the reflected light of the pre-light emission, and a primary light emission amount should be determined, it is impossible to obtain an exact primary light emission amount due to influence of light other than the reflected light of the pre-light emission. In the case of FIG. 3, according to a situation, there is a possibility that the Christmas tree 32 will be misrecognized as a main subject, and the amount of light emission during the primary image taking is dragged by the brightness of the Christmas tree 32 such that the amount of light emission is determined to be small, resulting in underexposure, and thus it is impossible to perform satisfactory image taking.

Figure 6:
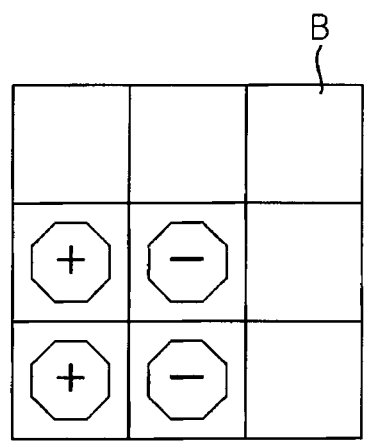
FIG. 6 is a view explaining that areas where brightness differences are positive and areas where brightness differences are negative exist adjacent to each other.

Further, in the present embodiment, in a case where all areas B includes areas B with positive brightness differences and areas B with negative brightness differences together as shown in FIG. 6, the light emission amount determining unit 19 determines areas B (hereinafter, referred to as specific areas) which can be misrecognized as a main subject, from among all areas B, and performs control for making evaluation values which are calculated with respect to the specific areas, to values (less than the threshold value) having no influence on the determination of the amount of light emission for the primary image taking.

As shown in FIG. 3, the specific areas are the areas where the Christmas tree 32 exists in the pre-light emission taken image data 40. In the range of the specific areas, an area where there was the Christmas tree 32 in the non-light emission taken image data 30 (areas B with negative brightness differences) necessarily exists. In other words, in areas around the area B with the negative brightness difference (for example, areas except for the area with the negative brightness difference among 8 areas around the corresponding area B or 4 areas B on, below, right, or left of the corresponding area B), the specific area necessarily exists.

Next, the light emission amount determining unit 19 detects an area B with a negative brightness difference from all areas B, determines areas B around the detected area B as specific areas, and performs control for reducing evaluation values which are calculated with respect to the specific areas.

As a control method for reducing evaluation values, there are methods which reduce a brightness difference calculated with respect to a specific area by multiplying the corresponding brightness difference with a correction coefficient or subtracting a correction coefficient from the corresponding brightness difference. Also, there are methods which reduce a weight value set for a specific area by multiplying the corresponding weight value by a correction coefficient or subtracting a correction coefficient from the corresponding weight value. Further, there are methods which reduce an evaluation value calculated with respect to a specific area by multiplying the corresponding evaluation value by a correction coefficient or subtracting a correction coefficient from the corresponding evaluation value.

If the control for reducing the evaluation values calculated with respect to the specific areas is performed as described above, the evaluation values calculated with reference to the specific areas become values (less than threshold value) having no influence on the determination of the amount of light emission for the primary image taking, such that the specific areas are not misrecognized as areas including the main subject. As a result, it is possible to determine the amount of light emission for the primary image taking only on the basis of the evaluation values of the areas B including the main subject, underexposure is prevented, and satisfactory image taking becomes possible.

Figure 7:
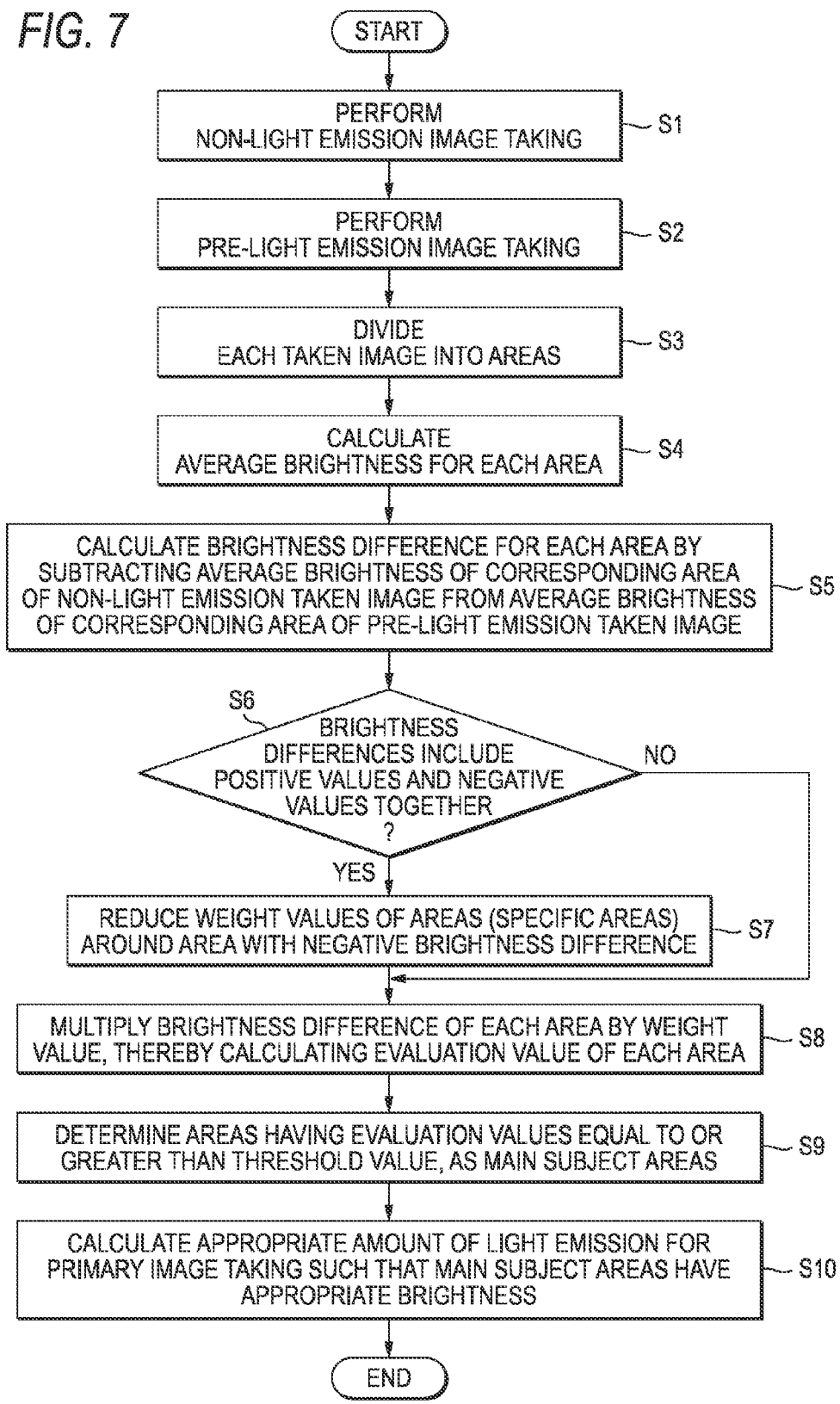
FIG. 7 is a flow chart for explaining an operation of the digital camera shown in FIG. 1 during image taking.

Next, an operation of the digital camera shown in FIG. 1 during image taking will be described. FIG. 7 is a flow chart for explaining the operation of the digital camera shown in FIG. 1 during image taking. Hereinafter, a case where control to reduce weight values set for the specific areas is performed as the control for reducing the evaluation values of the specific areas will be described. Also, a case where data in which weight values are constant in all areas as shown in FIG. 4 is used as the weight data will be described.

If the digital camera is set to an image taking mode, according to control of the system control unit 11, consecutive image taking of the solid-state image sensing element 5 starts. Taken image signals sequentially output from the solid-state image sensing element 5 are processed in the digital signal processing unit 17, whereby taken image data is generated, and images based on the taken image data are sequentially displayed on the display unit 23. The user of the digital camera can check the subject during image taking by images (through-the-lens images) which are sequentially displayed on the display unit 23.

If the user pushes the shutter button included in the operation unit 14, thereby issuing an image taking instruction, the system control unit 11 performs image taking (non-light emission image taking) by the solid-state image sensing element 5 in a state where auxiliary light is not emitted from the light emitting unit 12 (STEP S1). Taken image signals output from the solid-state image sensing element 5 by that non-light emission image taking are processed in the digital signal processing unit 17, whereby non-light emission taken image data is generated, and this non-light emission taken image data is temporarily stored in the main memory 16.

After the non-light emission image taking, the system control unit 11 performs image taking (pre-light emission image taking) by the solid-state image sensing element 5 in a state where auxiliary light is emitted (freely emitted) from the light emitting unit 12 (STEP S2). Taken image signals output from the solid-state image sensing element 5 by that pre-light emission image taking are processed in the digital signal processing unit 17, whereby pre-light emission taken image data is generated, and this pre-light emission taken image data is temporarily stored in the main memory 16.

If the pre-light emission image taking terminates, the light emission amount determining unit 19 acquires the non-light emission taken image data and the pre-light emission taken image data from the main memory 16, and divides the non-light emission taken image data and the pre-light emission taken image data into a plurality of area common to them (STEP S3). Also, in the plurality of areas, all areas do not need to have the same size, and areas having different sizes may exist together.

Next, for each segment area of the non-light emission taken image data, the light emission amount determining unit 19 calculates the average of brightness (average brightness value) of pixel data in the corresponding segment area, and for each segment area of the pre-light emission taken image data, the light emission amount determining unit calculates the average of brightness (average brightness value) of pixel data in the corresponding segment area (STEP S4).

Next, for each segment area, the light emission amount determining unit 19 subtracts the average brightness value of the non-light emission taken image data calculated with respect to the corresponding segment area from the average brightness value of the pre-light emission taken image data calculated with respect to the corresponding segment area, thereby calculating a brightness difference (STEP S5).

Next, the light emission amount determining unit 19 determines whether segment areas in which the brightness differences calculated in STEP S5 are positive and segment areas in which the brightness differences calculated in STEP S5 are negative exit together (STEP S6). In a case where segment areas with positive brightness differences and segment areas with negative brightness differences exist together, the light emission amount determining unit 19 proceeds to STEP S7, and in a case where only segment areas with positive brightness differences exist, the light emission amount determining unit proceeds to STEP S8.

In STEP S7, the light emission amount determining unit 19 determines segment areas around a segment area with a negative brightness difference, as specific areas, and performs a process of multiplying weight values set for the specific areas by correlation coefficients, thereby reducing the corresponding weight values.

Figure 8:
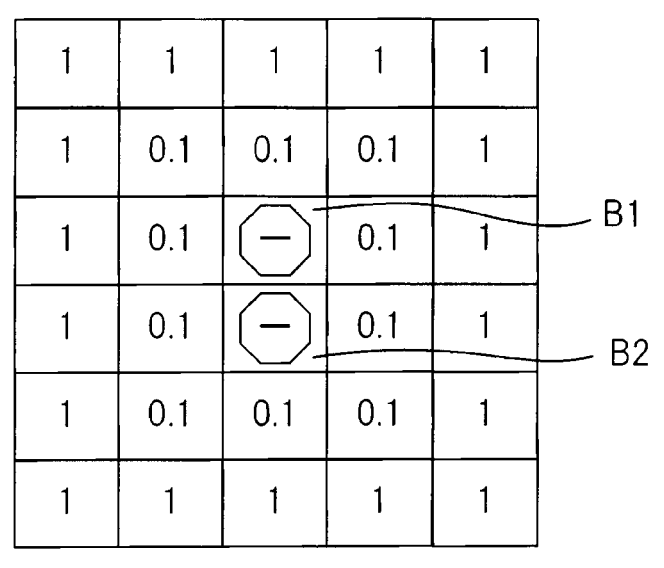

For example, in STEP S7, as shown in FIG. 8, weight values of 10 segment areas around segment areas B1 and B2 with negative brightness differences are reduced from 1 to 0.1.

In STEP S8 after STEP S7, the light emission amount determining unit 19 multiplies a brightness difference calculated for each segment area by a weight value set for the corresponding segment area (a corrected weight value in a case where the process of STEP S7 has been performed), thereby calculating an evaluation value for each segment area.

Next, the light emission amount determining unit 19 determines segment areas in which evaluation values calculated in STEP S8 are equal to or greater than the threshold value, as segment areas including the main subject (STEP S9).

Next, the light emission amount determining unit 19 calculates the amount of light emission for the primary image taking on the basis of the evaluation values of the segment areas determined as the areas including the main subject, such that the main subject has appropriate brightness (target brightness), and converts the amount of light emission into the light emission time, and notifies the light emission time to the system control unit 11 (STEP S10).

If receiving information on the light emission time from the light emission amount determining unit 19, the system control unit 11 makes the solid-state image sensing element 5 perform the primary image taking while making auxiliary light be emitted from the light emitting unit 12 for the corresponding light emission time. Taken image data obtained by that primary image taking is recorded in the recording medium 21, and the series of image taking operations terminates. Also, the function of the light emission amount determining unit 19 may be performed by the system control unit 11.

As described above, according to the digital camera shown in FIG. 1, even in a case where a subject has moved between the non-light emission image taking and the pre-light emission image taking, or the digital camera has shaken, and thus there is a possibility that misrecognition of the main subject will occur, control is performed such that evaluation values calculated with respect to segment areas (specific areas) around a segment area with a negative brightness difference are reduced. Therefore, it is possible to prevent the specific areas from being misrecognized as areas including the main subject, and it is possible to perform satisfactory image taking which is free of underexposure.

This effect is particularly great in a scene for image taking in a case where a high-brightness light source is included in an angle of view. For example, in a case where there is a high-brightness subject such as the sky, a cloud, or the sun during outdoor image taking, a case where it is generally dark and an illumination is at a portion, or the like, it is possible to obtain a pronounced effect.

In a case where underexposure occurs, this digital camera handles the underexposure by removing the cause of the underexposure (an increase in the evaluation value of an area including the light source), not by simply increasing the amount of light emission. Therefore, as compared to a case of handle the underexposure by simply increasing the amount of light emission, it is possible to dramatically improve the accuracy of the determination of the amount of light emission.

In the preliminary light emission control scheme, as the amount of auxiliary light emission during the pre-light emission image taking is small, in a case where a subject has moved between the non-light emission image taking and the pre-light emission image taking, or the digital camera has shaken, it is easy for misrecognition of the main subject to occur. According to the digital camera shown in FIG. 1, even if the amount of auxiliary light emission for the pre-light emission image taking is set to be small, it is possible to prevent misrecognition of the main subject. Therefore, it is possible to expect merits such as a reduction in power consumption and a reduction in cost.

Also, according to the digital camera shown in FIG. 1, only in special cases where a subject has moved between the non-light emission image taking and the pre-light emission image taking, or the digital camera has shaken, control for changing the evaluation values is performed, and during normal image taking other than the special cases, the evaluation values are not changed. Therefore, it is possible to improve image taking quality in the special cases than that in the related art, without influencing image taking quality during normal image taking other than the special cases.

Also, in the above description, the light emission amount determining unit 19 determines all of segment areas around a segment area with a negative brightness difference (except for the segment area with the negative brightness difference) as the specific areas; however it may determine some of the segment areas around the segment area with the negative brightness difference, as the specific areas. In this case, the light emission amount determining unit 19 determines segment areas to be the specific areas according to an image taking situation, from among the segment areas around the segment area with the negative brightness difference. Hereinafter, three methods of determining the specific areas according to an image taking situation will be described.

(First Pattern)

The light emission amount determining unit 19 determines the movement direction of a bright portion such as a light source included in a subject, between the non-light emission image taking and the pre-light emission image taking. Next, the light emission amount determining unit 19 determines a segment area neighboring a segment area with a negative brightness difference in the corresponding movement direction, as a specific area, among areas around the segment area with the negative brightness difference. Also, the light emission amount determining unit 19 determines a segment area neighboring the segment area with the negative brightness difference in a direction opposite to the corresponding movement direction, as a specific area.

The movement direction of the bright portion included in the subject can be determined by comparing the brightness value distributions of non-light emission taken image data and pre-light emission taken image data included in segment areas around the segment area with the negative brightness difference.

Figure 9:
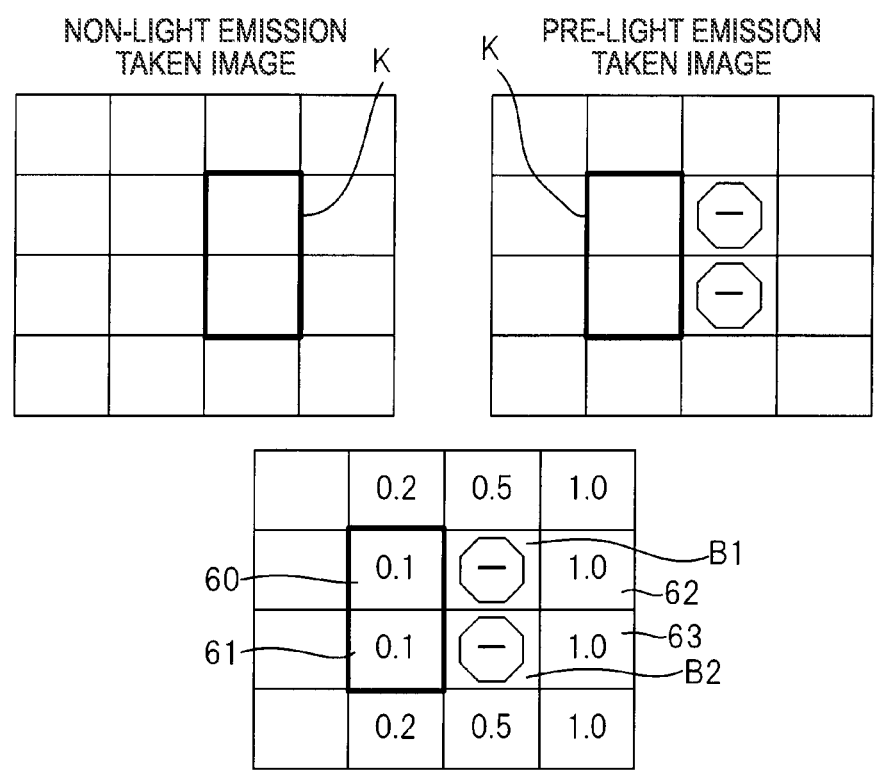
FIG. 9 is a view illustrating an example of change of weight values of segment areas around segment areas where brightness differences are negative.

For example, a case where a light source K included in non-light emission taken image data has moved to a left direction in pre-light emission taken image data as shown in FIG. 9 can be considered.

In this case, the light emission amount determining unit 19 determines segment areas 60 and 61 neighboring segment areas B1 and B2 with negative brightness differences in left directions, as specific areas, and changes weight values of the specific areas from 1.0 to 0.1, and determines segment areas 62 and 63 neighboring the segment areas B1 and B2 in right directions, as non-specific areas, and maintains weight values set for the non-specific areas at 1.0.

With respect to the other segment areas, in FIG. 9, weight values change to gradually increase according to distances from the segment areas 60 and 61. However, this change is not essential, and may not be performed.

If control for changing the weight values as shown in FIG. 9 is performed, for example, even in a case where a portion of a main subject is included in the segment areas 62 and 63, it is possible to prevent that portion from being misrecognized as not being the main subject. As a result, it is possible to improve the accuracy of the determination of the amount of light emission.

(Second Pattern)

In the digital camera shown in FIG. 1, a motion detecting unit for detecting a motion (shake) of the digital camera is provided, and the light emission amount determining unit 19 determines specific areas according to the motion direction of the digital camera between the non-light emission image taking and the pre-light emission image taking.

Figure 10:
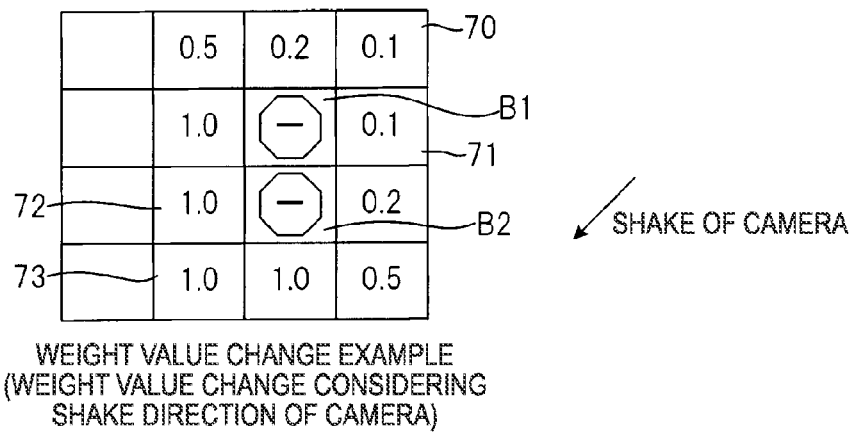
FIG. 10 is a view illustrating an example of change of weight values of segment areas around segment areas where brightness differences are negative.

For example, a case where the shake direction of the digital camera is an oblique direction to the bottom left as shown by an arrow in FIG. 10 can be considered.

In this case, the light emission amount determining unit 19 determines segment areas 70 and 71 neighboring segment areas B1 and B2 with negative brightness differences in directions opposite to the shake direction of the digital camera, among segment areas around the segment areas B1 and B2, as specific areas, and changes weight values of the specific areas from 1.0 to 0.1. The light emission amount determining unit 19 determines segment areas 72 and 73 neighboring the segment areas B1 and B2 in the shake direction of the digital camera, as non-specific areas, and does not change weight values with respect to the non-specific areas.

With respect to the other segment areas, in FIG. 10, weight values are changed to gradually increase according to distances from the segment areas 70 and 71. However, this change is not essential, and may not be performed.

If control for changing the weight values as shown in FIG. 10 is performed, for example, even in a case where a portion of a main subject is included in the segment areas 72 and 73, it is possible to prevent that portion from being misrecognized as not being the main subject. As a result, it is possible to improve the accuracy of the determination of the amount of light emission.

(Third Pattern)

In the digital camera shown in FIG. 1, a subject motion detecting unit for detecting a motion of a subject is provided, and the light emission amount determining unit 19 determines specific areas according to the motion direction of the subject between non-light emission image taking and pre-light emission image taking. A motion of the subject can be detected by comparing non-light emission taken image data and pre-light emission taken image data.

Figure 11:
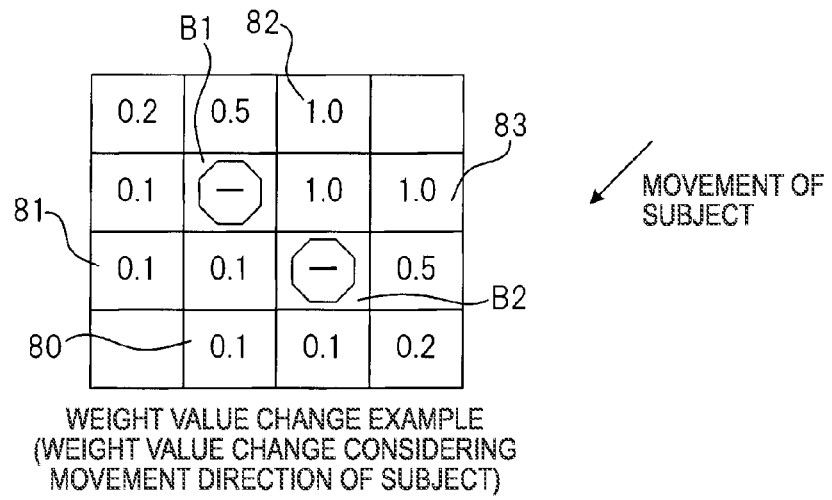
FIG. 11 is a view illustrating an example of change of weight values of segment areas around segment areas where brightness differences are negative.

For example, a case where the motion direction of the subject is an oblique direction to the bottom left as shown by an arrow in FIG. 11 can be considered.

In this case, the light emission amount determining unit 19 determines segment areas 80 and 81 neighboring segment areas B1 and B2 with negative brightness differences in the motion direction of the subject, among segment areas around the segment areas B1 and B2, as specific areas, and changes weight values of the specific areas from 1.0 to 0.1. Also, the light emission amount determining unit 19 determines segment areas 82 and 83 neighboring the segment areas B1 and B2 in directions opposite to the motion direction of the subject, as non-specific areas, and does not change weight values of the non-specific areas.

With respect to the other segment areas, in FIG. 11, weight values are changed to gradually increase according to distances from the segment areas 80 and 81. However, this change is not essential, and may not be performed.

If control for changing the weight values as shown in FIG. 11 is performed, for example, even in a case where a portion of a main subject is included in the segment areas 82 and 83, it is possible to prevent that portion from being misrecognized as not being the main subject, and it is possible to further improve the accuracy of the determination of the amount of light emission.

In the digital camera shown in FIG. 1, a main subject detecting unit for detecting a main subject included in pre-light emission taken image data may be provided, and the light emission amount determining unit 19 may determine specific areas according to the position of the main subject.

The main subject detecting unit detects a main subject by using a method of detecting the face of a person or the like from pre-light emission taken image data as the main subject with a known face detecting process, a method of acquiring information on an auto focus (AF) area which is set with respect to the digital camera and detecting a subject in the AF area as the main subject, and a method of acquiring information on subject distance obtained from focusing information and the like and detecting a subject within a short distance as the main subject.

In case where the result of STEP S6 of FIG. 7 is YES, the main subject detecting unit of the digital camera detects a main subject included in the pre-light emission taken image data, and notifies segment areas including the main subject to the light emission amount determining unit 19.

When determining the specific areas in STEP S7, the light emission amount determining unit 19 does not determine the segment areas including the main subject notified from the main subject detecting unit, as the specific areas, and does not perform change of weight values regarding those segment areas.

Figure 12:
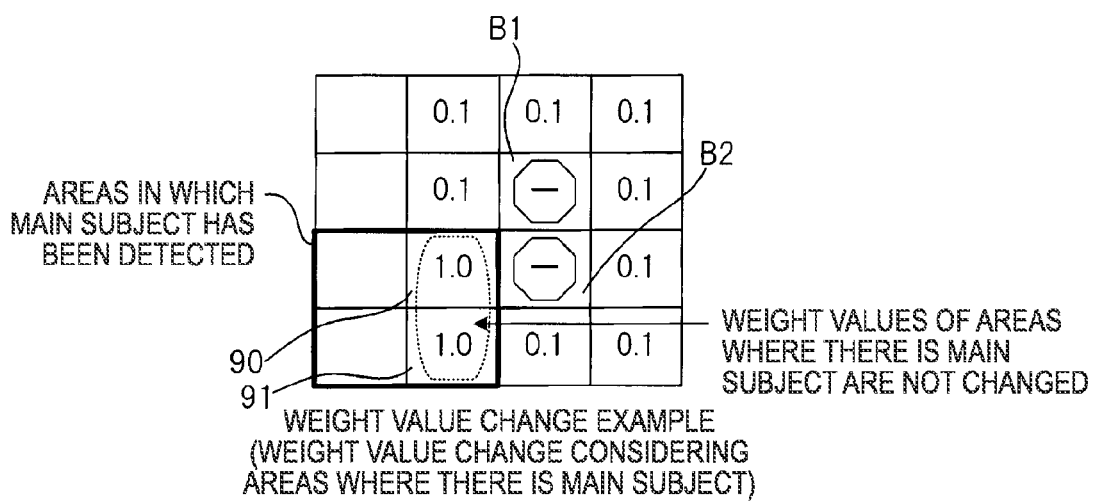
FIG. 12 is a view illustrating an example of change of weight values of segment areas around segment areas where brightness differences are negative.

For example, in a case where segment areas 90 and 91 of segment areas around segment areas B1 and B2 with negative brightness differences are areas including the main subject detected by the main subject detecting unit as shown in FIG. 12, the light emission amount determining unit 19 does not change weight values with respect to the segment areas 90 and 91, but changes the weight values of the other segment areas from 1.0 to 0.1.

By doing this, it is possible to prevent the evaluation values of the segment areas including the main subject from being reduced, and it is possible to improve the accuracy of the determination of the amount of light emission. Also, the process described with reference to FIG. 12 can be performed by a combination of the first to third patterns.

In all embodiments described until now, with respect to areas determined as non-specific areas, evaluation values may be controlled such that they are greater than those during normal time.

Also, in all embodiments described until now, the change amounts of the evaluation values of the specific areas may be changed according to the magnitudes of the brightness differences of the specific areas.

If the brightness difference of a specific area is large, an evaluation value is also large. For this reason, if reductions in the evaluation values of the specific areas are increased according to the magnitudes of the brightness differences of the specific areas (for example, correlation coefficients to be multiplied by weight values are decreased according to the magnitudes of the brightness differences of the specific areas), it is possible to surely prevent the evaluation values of the specific areas from increasing.

Also, in all embodiments described until now, the change amounts of the evaluation values of the specific areas may be changed according to the magnitudes of the brightness differences of areas in which brightness differences generated with respect to the specific areas become negative.

If the brightness differences (absolute values) of the areas with a negative brightness difference are great, the brightness differences of the specific areas are also great. For this reason, if reductions in the evaluation values of the specific areas are increased according to the magnitudes of the brightness differences of the areas with the negative brightness differences, it is possible to surely prevent the evaluation values of the specific areas from increasing.

Also, in all embodiments described until now, with respect to segment areas with excessively great brightness differences, the light emission amount determining unit 19 may determine that those segment areas have been highlighted, and may exclude those segment areas from the subjects of calculation of the amount of light emission for the primary image taking. By doing like this, it is possible to perform control on the amount of light emission with higher accuracy.

Also, in all embodiments described until now, the calculation when a brightness difference may be inversely performed, that is, brightness differences may be calculated by subtracting the pre-light emission taken image data 40 from the non-light emission taken image data 30, and evaluation values may be calculated by multiplying the brightness differences by weight values, and segment areas in which the calculated evaluation values are less than a threshold value, as segment areas including a main subject, and the amount of light emission for the primary image taking may be determined on the basis of the evaluation values of the corresponding segment areas.

In this case, if there is no motion in a subject or the digital camera, the brightness differences calculated with respect to all segment areas become negative, and in a case where there is a motion in a subject or the digital camera, all segment areas include areas with positive brightness differences and areas with negative brightness differences together.

Therefore, in a case where all segment areas include areas with positive brightness differences and areas with negative brightness differences together, the light emission amount determining unit 19 may determine at least a portion of segment areas around the segment areas with the negative brightness differences, as specific areas, and perform a process for increasing the evaluation values which are calculated with respect to those specific areas.

By doing like this, as described above, it is possible to prevent misrecognition of the main subject and perform satisfactory image taking.

As described above, in this specification, the following items are disclosed.

A disclosed imaging device is an imaging device having a light emitting unit for emitting auxiliary light during image taking, comprising: a taken image data acquiring unit that acquires non-light emission taken image data which is obtained by non-light emission image taking in which image taking is performed in a state where auxiliary light is not emitted from the light emitting unit, and pre-light emission taken image data which is obtained by pre-light emission image taking in which image taking is performed in a state where auxiliary light is emitted from the light emitting unit; a brightness difference calculating unit that calculates a brightness difference between the non-light emission taken image data and the pre-light emission taken image data for each of segment areas common to the non-light emission taken image data and the pre-light emission taken image data; an evaluation value calculating unit that calculates an evaluation value of each of the segment areas on the basis of the brightness difference of each of the segment areas; a light emission amount determining unit that determines a light emission amount of auxiliary light to be emitted from the light emitting unit during primary image taking, on the basis of the evaluation value of each of the segment areas; and an evaluation value change control unit that performs control for changing the evaluation values which are calculated with respect to specific areas which are at least a portion of segment areas around a segment area in which the calculated brightness difference is negative or a segment area in which the calculated brightness difference is positive, in a case where the brightness differences of all of the segment areas calculated by the brightness difference calculating unit include negative brightness differences and positive brightness differences together.

A disclosed imaging device is the imaging device wherein the specific areas are a portion of segment areas around the segment area in which the calculated brightness difference is negative or the segment area in which the calculated brightness difference is positive, and wherein the evaluation value change control unit determines the specific areas according to an image taking situation.

A disclosed imaging device is the imaging device, wherein the image taking situation is any one of a movement direction of a bright portion included in a subject between the non-light emission image taking and the pre-light emission image taking, a motion direction of the imaging device between the non-light emission image taking and the pre-light emission image taking, and a motion direction of a subject between the non-light emission image taking and the pre-light emission image taking.

A disclosed imaging device is the imaging device further comprising a main subject detecting unit that detects a main subject from the pre-light emission taken image data, wherein the evaluation value change control unit does not perform the control for changing the evaluation values with respect to segment areas including the main subject.

A disclosed imaging device is the imaging device, wherein the evaluation value change control unit controls change amounts of the evaluation values according to the magnitudes of the brightness differences calculated with respect to the segment areas in which the brightness differences are negative, or the segment areas in which the brightness differences are positive.

A disclosed imaging device is the imaging device, wherein the evaluation value change control unit controls change amounts of the evaluation values according to the brightness differences calculated with respect to the specific areas.

A disclosed light emission amount control method of an imaging device is a light emission amount control method of an imaging device having a light emitting unit for emitting auxiliary light during image taking, comprising: a taken image data acquiring step that acquires non-light emission taken image data which is obtained by non-light emission image taking in which image taking is performed in a state where auxiliary light is not emitted from the light emitting unit, and pre-light emission taken image data which is obtained by pre-light emission image taking in which image taking is performed in a state where auxiliary light is emitted from the light emitting unit; a brightness difference calculating step that calculates a brightness difference between the non-light emission taken image data and the pre-light emission taken image data for each of segment areas common to the non-light emission taken image data and the pre-light emission taken image data; an evaluation value calculating step that calculates an evaluation value of each of the segment areas on the basis of the brightness difference of each of the segment areas; a light emission amount determining step that determines a light emission amount of auxiliary light to be emitted from the light emitting unit during primary image taking, on the basis of the evaluation value of each of the segment areas; and an evaluation value change control step that performs control for changing the evaluation values which are calculated with respect to specific areas which are at least a portion of segment areas around a segment area in which the calculated brightness difference is negative or a segment area in which the calculated brightness difference is positive, in a case where the brightness differences of all of the segment areas calculated by the brightness difference calculating step include negative brightness differences and positive brightness differences together.

A disclosed light emission amount control method of an imaging device is the light emission amount control method of the imaging device, wherein the specific areas are a portion of segment areas around the segment area in which the calculated brightness difference is negative or the segment area in which the calculated brightness difference is positive, and wherein in the evaluation value change control step, the specific areas are determined according to an image taking situation.

A disclosed light emission amount control method of an imaging device is the light emission amount control method of the imaging device, wherein the image taking situation is any one of a movement direction of a bright portion included in a subject between the non-light emission image taking and the pre-light emission image taking, a motion direction of the imaging device between the non-light emission image taking and the pre-light emission image taking, and a motion direction of a subject between the non-light emission image taking and the pre-light emission image taking.

A disclosed light emission amount control method of an imaging device is the light emission amount control method of the imaging device, further comprising a main subject detecting step that detects a main subject from the pre-light emission taken image data, wherein in the evaluation value change control step, the control for changing the evaluation values is not performed with respect to segment areas including the main subject.

A disclosed light emission amount control method of an imaging device is the light emission amount control method of the imaging device, wherein in the evaluation value change control step, change amounts of the evaluation values are controlled according to the magnitudes of the brightness differences calculated with respect to the segment areas in which the brightness differences are negative, or the segment areas in which the brightness differences are positive.

A disclosed light emission amount control method of an imaging device is the light emission amount control method of the imaging device according to, wherein in the evaluation value change control step, change amounts of the evaluation values are controlled according to the brightness differences calculated with respect to the specific areas.

According to the present invention, it is possible to provide an imaging device capable of quickly determining an amount of auxiliary light emission with high accuracy, and a light emission amount control method of the imaging device.

Although the present invention has been described in detail with reference to the specific embodiments, it is apparent to those skilled in the art that it is possible to apply various changes and modifications without departing from the spirit and scope of the present invention.

What is claimed is:

1. An imaging device having a light emitting unit for emitting auxiliary light during image taking, comprising:
   a taken image data acquiring unit that acquires non-light emission taken image data which is obtained by non-light emission image taking in which image taking is performed in a state where auxiliary light is not emitted from the light emitting unit, and pre-light emission taken image data which is obtained by pre-light emission image taking in which image taking is performed in a state where auxiliary light is emitted from the light emitting unit;
   a brightness difference calculating unit that calculates a brightness difference obtained by subtracting the pre-light emission taken image data from the non-light emission taken image data or a brightness difference obtained by subtracting the non-light emission taken image data from the pre-light emission taken image data, for each of segment areas common to the non-light emission taken image data and the pre-light emission taken image data;
   an evaluation value calculating unit that calculates an evaluation value of each of the segment areas on the basis of the brightness difference of each of the segment areas;
   a light emission amount determining unit that determines a light emission amount of auxiliary light to be emitted from the light emitting unit during primary image taking, on the basis of the evaluation value of each of the segment areas; and
   an evaluation value change control unit that performs control for changing first evaluation values which are calculated with respect to specific areas which are at least a portion of segment areas around at least one segment area in which a brightness difference calculated by subtracting the non-light emission taken image data from the pre-light emission taken image data is negative or at least one a segment area in which a brightness difference calculated by subtracting the pre-light emission taken image data from the non-light emission taken image data is positive so that the first evaluation values are reduced when each brightness difference is calculated by subtracting the non-light emission taken image data from the pre-light emission taken image data and an absolute value of negative first evaluation values are reduced when each brightness difference is calculated by subtracting the pre-light emission taken image data from the non-light emission taken image data, in a case where the brightness differences of all of the segment areas calculated by the brightness difference calculating unit include negative brightness differences and positive brightness differences together.

2. The imaging device according to claim 1, wherein the specific areas are a portion of segment areas around the at least one segment area in which the calculated brightness difference calculated by subtracting the non-light emission taken image data from the pre-light emission taken image data is negative or the at least one segment area in which the calculated brightness difference calculated by subtracting the pre-light emission taken image data from the non-light emission taken image data is positive, and wherein the evaluation value change control unit determines the specific areas according to an image taking situation.

3. The imaging device according to claim 2, wherein the image taking situation is any one of a movement direction of a bright portion included in a subject between the non-light emission image taking and the pre-light emission image taking, a motion direction of the imaging device between the non-light emission image taking and the pre-light emission image taking, and a motion direction of a subject between the non-light emission image taking and the pre-light emission image taking.

4. The imaging device according to claim 1, further comprising a main subject detecting unit that detects a main subject from the pre-light emission taken image data, wherein the evaluation value change control unit does not perform the control for changing the first evaluation values with respect to segment areas including the main subject.

5. The imaging device according to claim 1, wherein the evaluation value change control unit controls change amounts of the first evaluation values according to the magnitudes of the brightness differences calculated with respect to the at least one segment areas in which the brightness differences calculated by subtracting the non-light emission taken image data from the pre-light emission taken image data is negative, or the at least one segment area in which the brightness differences calculated by subtracting the pre-light emission taken image data from the non-light emission taken image data is positive.

6. The imaging device according to claim 1, wherein the evaluation value change control unit controls change amounts of the first evaluation values according to the brightness differences calculated with respect to the specific areas.

7. A light emission amount control method of an imaging device having a light emitting unit for emitting auxiliary light during image taking, comprising:
   a taken image data acquiring step that acquires non-light emission taken image data which is obtained by non-light emission image taking in which image taking is performed in a state where auxiliary light is not emitted from the light emitting unit, and pre-light emission taken image data which is obtained by pre-light emission image taking in which image taking is performed in a state where auxiliary light is emitted from the light emitting unit;
   a brightness difference calculating step that calculates a brightness difference obtained by subtracting the pre-light emission taken image data from the non-light emission taken image data or a brightness difference obtained by subtracting the non-light emission taken image data from the pre-light emission taken image data, for each of segment areas common to the non-light emission taken image data and the pre-light emission taken image data;
   an evaluation value calculating step that calculates an evaluation value of each of the segment areas on the basis of the brightness difference of each of the segment areas;
   a light emission amount determining step that determines a light emission amount of auxiliary light to be emitted from the light emitting unit during primary image taking, on the basis of the evaluation value of each of the segment areas; and
   an evaluation value change control step that performs control for changing first evaluation values which are calculated with respect to specific areas which are at least a portion of segment areas around at least one segment area in which a brightness difference calculated by subtracting the non-light emission taken image data from the pre-light emission taken image data is negative or a at least one segment area in which a brightness difference calculated by subtracting the pre-light emission taken image data from the non-light emission taken image data is positive so that the first evaluation values are reduced when each brightness difference is calculated by subtracting the non-light emission taken image data from the pre-light emission taken image data and an absolute value of negative first evaluation values are reduced when each brightness difference is calculated by subtracting the pre-light emission taken image data from the non-light emission taken image data, in a case where the brightness differences of all of the segment areas calculated by the brightness difference calculating step include negative brightness differences and positive brightness differences together.

8. The light emission amount control method of the imaging device according to claim 7, wherein the specific areas are a portion of segment areas around the at least one segment area in which the calculated brightness difference calculated by subtracting the non-light emission taken image data from the pre-light emission taken image data is negative or the at least one segment area in which the calculated brightness difference calculated by subtracting the pre-light emission taken image data from the non-light emission taken image data is positive, and
wherein in the evaluation value change control step, the specific areas are determined according to an image taking situation.

9. The light emission amount control method of the imaging device according to claim 8, wherein the image taking situation is any one of a movement direction of a bright portion included in a subject between the non-light emission image taking and the pre-light emission image taking, a motion direction of the imaging device between the non-light emission image taking and the pre-light emission image taking, and a motion direction of a subject between the non-light emission image taking and the pre-light emission image taking.

10. The light emission amount control method of the imaging device according to claim 7, further comprising a main subject detecting step that detects a main subject from the pre-light emission taken image data, wherein in the evaluation value change control step, the control for changing the first evaluation values is not performed with respect to segment areas including the main subject.

11. The light emission amount control method of the imaging device according to claim 7, wherein in the evaluation value change control step, change amounts of the first evaluation values are controlled according to the magnitudes of the brightness differences calculated with respect to the at least one segment area in which the brightness difference calculated by subtracting the non-light emission taken image data from the pre-light emission taken image data are negative, or the at least one segment area in which the brightness difference calculated by subtracting the pre-light emission taken image data from the non-light emission taken image data are positive.

12. The light emission amount control method of the imaging device according to claim 7, wherein in the evaluation value change control step, change amounts of the first evaluation values are controlled according to the brightness differences calculated with respect to the specific areas.

* * * * *